United States Patent
Shih et al.

(10) Patent No.: US 6,937,369 B2
(45) Date of Patent: Aug. 30, 2005

(54) METHOD AND APPARATUS FOR POSITIONING A SCANNING STARTING POINT OF AN IMAGE SCANNING APPARATUS

(75) Inventors: Po-Sheng Shih, Hsinchu (TW); Hsing-Hung Lin, Hsinchu (TW)

(73) Assignee: Avision Inc., Hsinchu (TW)

( * ) Notice: Subject to any disclaimer, the term of this patent is extended or adjusted under 35 U.S.C. 154(b) by 877 days.

(21) Appl. No.: 09/850,067

(22) Filed: May 8, 2001

(65) Prior Publication Data

US 2003/0095294 A1 May 22, 2003

(30) Foreign Application Priority Data

May 17, 2000 (TW) .......................................... 89109493 A

(51) Int. Cl.[7] .............................. H04N 1/04; H04N 1/00; H04N 1/46
(52) U.S. Cl. ........................ 358/486; 358/497; 358/488; 358/482; 358/483; 358/406; 358/494; 358/504; 358/506
(58) Field of Search .................................. 358/486, 497, 358/488, 482, 483, 406, 494, 504, 506, 474; 250/208.1

(56) References Cited

U.S. PATENT DOCUMENTS 6,229,629 B1 * 5/2001 Tsai ............................. 358/486
6,392,762 B1 * 5/2002 Tsai et al. .................... 358/488

* cited by examiner

*Primary Examiner*—Edward Coles
*Assistant Examiner*—Houshang Safaipour
(74) *Attorney, Agent, or Firm*—Rabin & Berdo, P.C.

(57) ABSTRACT

An apparatus for positioning a scanning starting point of an image scanning apparatus includes a platen, carriage, and a number of marks. The X-Y coordinate system defined by the platen has an X-axis defined by a first wide margin of the platen and a Y-axis defined by a first long margin of the platen. The carriage moves along the Y direction. The marks inside the image scanning apparatus indicate different Y coordinate values. The method for positioning a scanning starting point of an image scanning apparatus is as follows: the nearest mark to the document to be scanned is first chosen as a reference point. The vector from an image starting point of the document to be scanned to the reference point is then obtained. The carriage finally moves to the reference point chosen as a starting point and proceeds to scan.

19 Claims, 3 Drawing Sheets

US 6,937,369 B2

METHOD AND APPARATUS FOR POSITIONING A SCANNING STARTING POINT OF AN IMAGE SCANNING APPARATUS

This application incorporates by reference Taiwanese application Ser. No. 089109493, Filed May 17, 2000.

BACKGROUND OF THE INVENTION

1. Field of the Invention

The invention relates in general to the method and apparatus for positioning a scanning starting point of an image scanning apparatus, and more particularly to the method and apparatus for positioning a scanning starting point by utilizing multiple reference points to achieve high precision.

2. Description of the Related Art

In the multimedia age, image scanners are commonplace for users. The demand for high scanning quality and speed are increasing as well. The way to enhance the scanning speed is to make the image-capturing carriage move quickly and efficiently from its resting position to the scanning starting point to proceed the scanning. Conventionally, the methods for positioning a scanning starting point to initiate the image scanning are as follows:

(a) Referring to FIG. 1, Taiwan Patent Publication No. 147499 discloses that the reference point P for positioning is a corner of a reflecting area 12. The relative position between the reference point P and the scanning starting point Q is regulated before the product leaves the factory. After the position of the reference point P is determined, the carriage can then obtain the position of the scanning starting point Q. In this way, the carriage can move to the scanning starting point Q and proceed to scan.

(b) Referring to FIG. 2, Taiwan Patent Publication No. 338868 discloses that a mark 22 is used for positioning. After getting any two reference points P1 and P2 of the mark 22, the position of the scanning starting point Q can be obtained by the two reference points P1 and P2 according to the coordinates, functional relation, mark, and pre-determined length of the scanning starting point.

In the above cases, a scanning starting point is used as a starting position for the scanning carriage, however, the actual contents may not be exactly at the scanning starting point Q. Thus, in these cases, the carriage needs to traverse the distance between the scanning starting point Q and the actual contents of the document. Errors may occur during this due to the unsteady transmittal speed of the carriage, mechanical errors among transmission components, or transmittal errors of the carriage. Besides, the farther the actual contents are away from the scanning starting point, the larger the moving error is. Generally speaking, the moving error is around 2 mm when the carriage moves from the scanning starting point Q to the image starting point of the scanning area at a distance. This is not acceptable for high precision scanning and has become a topic that must be overcome.

SUMMARY OF THE INVENTION

It is therefore an object of the invention to provide an image scanning apparatus having a number of marks as reference points, disposed in the direction in which the carriage moves along. This will decrease errors due to wrongly selecting the scanning starting point as well as enhance both the precision and speed of image scanning by utilizing different reference points in different scanning areas.

The invention achieves the above-identified objects by providing an apparatus for positioning a scanning starting point of an image scanning apparatus. The apparatus includes a platen, carriage and a number of marks. The platen for a document to be placed thereon defines an orthogonal X-Y coordinate system. The X-Y coordinate system has an X-axis defined by a first wide margin of the platen and a Y-axis defined by a first long margin of the platen. The carriage is disposed in the image scanning apparatus and moves along the Y direction from a starting line for capturing an image of the document to be scanned. The marks inside the image scanning apparatus indicate different Y coordinate values as the reference points for the carriage to capture the images of the document to be scanned.

The invention achieves the above-identified objects by providing a method for positioning a scanning starting point of an image scanning apparatus. The image scanning apparatus includes a platen, carriage, and a number of marks. The platen for a document to be placed thereon defines an orthogonal X-Y coordinate system. The X-Y coordinate system has an X-axis defined by a first wide margin of the platen and a Y-axis defined by a first long margin of the platen. The carriage is disposed in the image scanning apparatus and moves along the Y direction from a starting line for capturing an image of the document to be scanned. The marks inside the image scanning apparatus indicate different Y coordinate values as the reference points for the carriage. The method for positioning a scanning starting point of an image scanning apparatus is as follows: the nearest mark to the document to be scanned is first chosen as a reference point. The vector from an image starting point of the document to be scanned to the reference point is then obtained. The carriage finally moves to the reference point chosen as a starting point and proceeds to scan.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
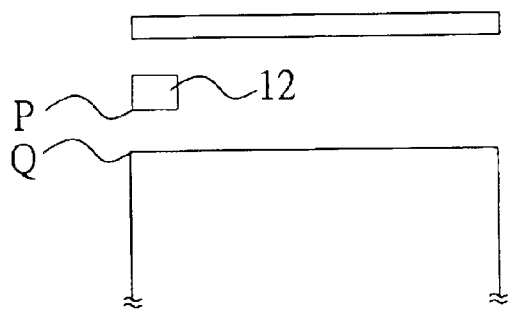
FIG. 1 (Prior Art) illustrates a schematic diagram of a traditional positioning method for an image scanning apparatus.
Figure 2:
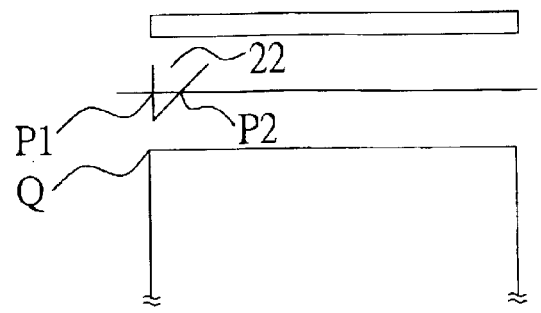
FIG. 2 (Prior Art) illustrates a schematic diagram of another traditional positioning method for an image scanning apparatus.
Figure 3:
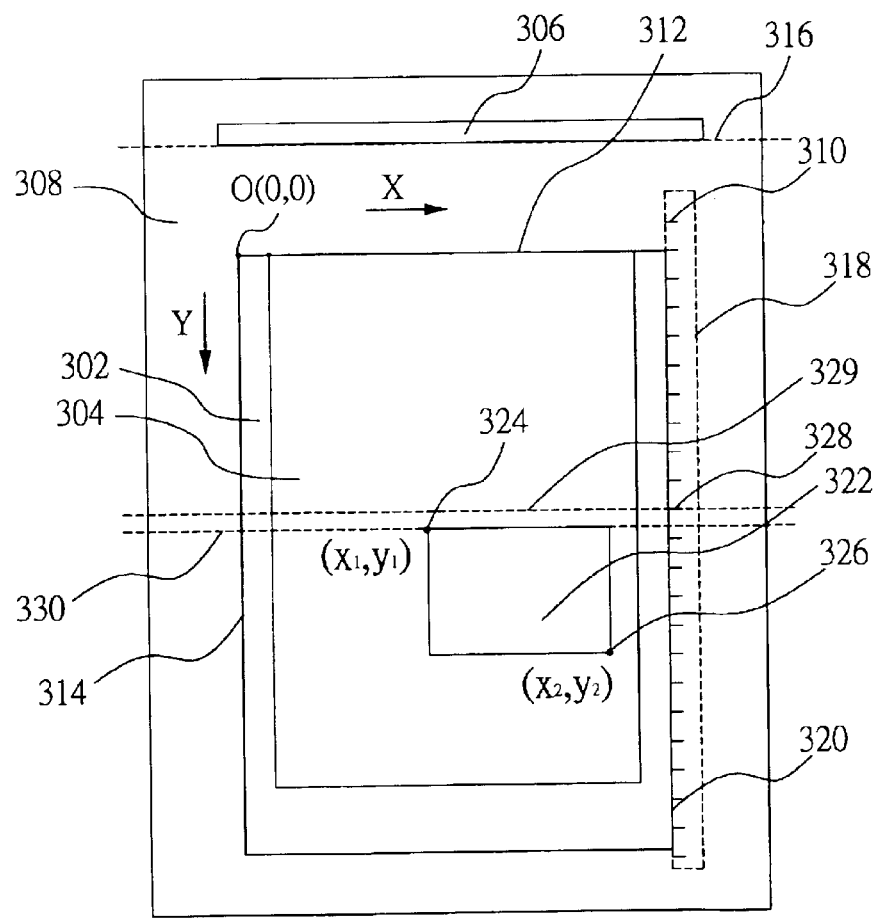
FIG. 3 shows a top perspective view of an image scanning apparatus for positioning a scanning starting point by utilizing multiple reference points according to a preferred embodiment of the invention.

Referring to FIG. 3, a top perspective view of an image scanning apparatus for positioning a scanning starting point by utilizing multiple reference points according to a preferred embodiment of the invention is shown. Taking a flatbed scanner for example, in general, a flatbed scanner includes a transparent platen 302, which is made of glass disposed on the casing 308. The document 304 to be scanned is placed upon the platen 302. The carriage 306 inside the flatbed scanner provides illumination and captures the image of the document 304 to be scanned. The carriage 306 includes a light source, reflecting optical module, lenses, and light sensing unit. The light sensing unit can be a Charge Coupled Device (CCD). A number of marks 310 located on flatbed scanner are used as the reference points for carriage 306 to capture the images of the document 304 to be scanned.

The first wide margin of the platen 302 is defined as the X-axis and the first long margin of the platen 302 is defined as the Y-axis. As shown in FIG. 3, the first wide margin can be the leading edge 312 with the X direction while the first long margin can be the side edge 314 with the Y direction. Since the leading edge 312 and the side edge 314 are orthogonal, the X-Y coordinate plane of the orthogonal X-Y coordinate system can be defined by the platen 302. The origin O (0, 0) is the intersection of the X-axis and Y-axis. The X and Y coordinate values of all the points on the platen 302 are positive. The carriage 306 moves along the Y direction from the first starting line 316, wherein the Y direction includes the positive-Y direction and negative-Y direction. The marking group area 318 contains all the marks. Each mark in the marking group area 318 is a fixed distance from the origin and set before the product leaves the factory. The basic unit of the X and Y coordinate is the pixel. Hence, the X coordinate value is controlled by counting the cells in the CCD while the Y coordinate value is controlled by the steps of the stepping motor.

All the marks disposed on the second side edge in the marking group area 318 preferably have the same X coordinate value. Taking the second side edge 320 for example, the marks in the marking group area 318 may have positive or negative Y coordinate values. As shown in FIG. 3, some marks disposed below the leading edge 312 of the platen 302 have positive Y coordinate value while the other marks disposed above the leading edge 312 of the platen 302 have negative Y coordinate value. There is no need to choose all the marks with positive Y coordinate value as reference points since the carriage 306 might move upwards or downwards.

Figure 4:
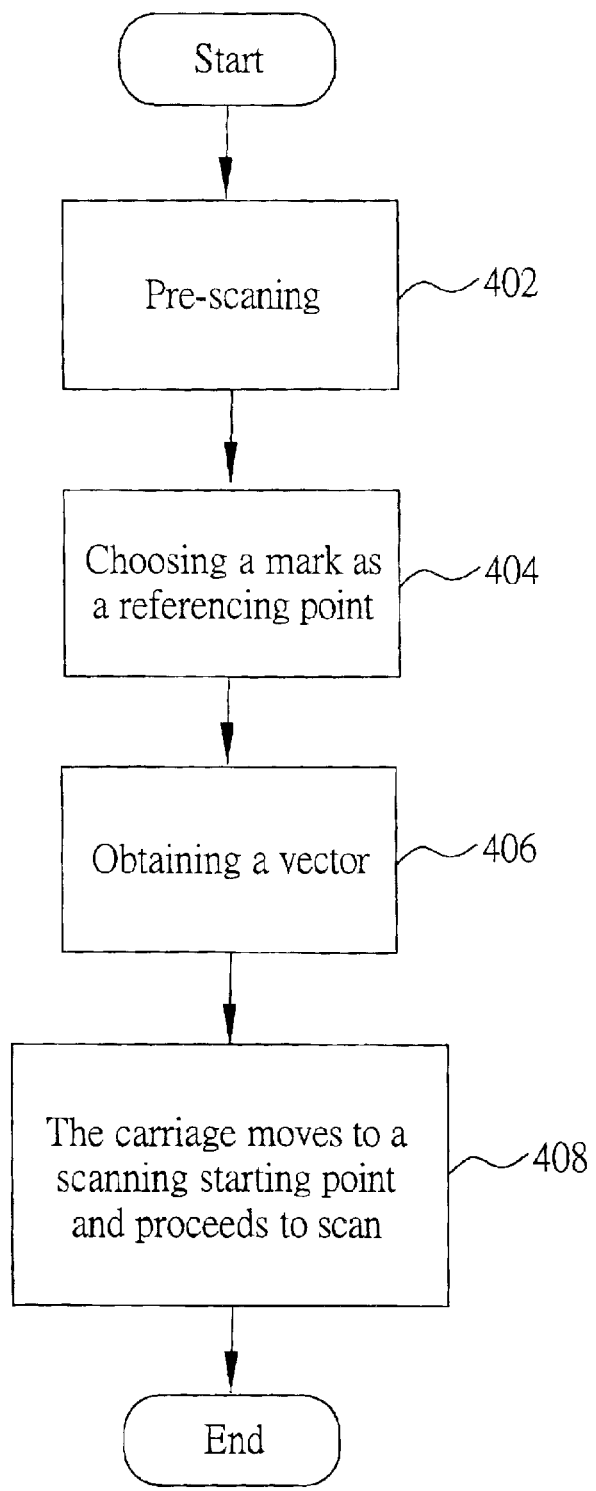
FIG. 4 illustrates a flow chart of a method for positioning a scanning starting point of an image scanning apparatus according to a preferred embodiment of the invention.

Referring to FIG. 4 along with FIG. 3, a flow chart of a method for positioning a scanning starting point of an image scanning apparatus according to a preferred embodiment of the invention is illustrated in FIG. 4. In step 402, the image scanning apparatus starts to pre-scan. The pre-scan is to scan the document 304 to be scanned at a low resolution in advance for obtaining the scanning area, namely, the image 322 to be scanned. The image 322 to be scanned includes an image starting point 324 and an image ending point 326. The coordinates of the image starting point 324 and an image ending point 326 are obtained after determining the image 322 to be scanned. Besides, the image starting point 324 is the starting point for scanning the image 322 to be scanned.

Step 404 is then performed, users can choose a suitable mark in the marking group area as the reference point according to the image 322 to be scanned. This can be the nearest mark of the image starting point 324 as an example. In the next step 406, a vector from an image starting point of the image 322 to be scanned to the reference point is obtained. For instance, the: vector (x, y) from the image starting point 324 to the mark 328 is shown in FIG. 3. The "x" is the difference between the X coordinate value of the image starting point and that of the mark 328 while "y" is the difference between the Y coordinate value of the image starting point 324 and that of the marks 328.

Step 408 is then performed whereby the carriage 306 moves to the second starting line 329 corresponding to the mark 328 being chosen as the reference point. The carriage 306 then moves y units towards the scanning starting line 330, which is the Y coordinate of the image starting point 324, and proceeds to scan the image 322 to be scanned. In this way, a scanning image of high precision is achieved.

As shown in FIG. 3, assuming that the determined scanning area is the rectangular image 322 defined by an image starting point 324 and an image ending point 326. The mark 328 nearest the image starting point 324 can be chosen as the reference point, The coordinates of the image starting point 324 are $(x_1, y_1)$, the coordinates of the image ending point 326 are $(x_2, y_2)$, and the coordinates of the mark 328 are $(x_3, y_3)$. The vector (x, y) from $(x_1, y_1)$ to $(x_3, y_3)$ can be obtained by means of calculation since the coordinates of the mark 328 are determined to be $(x_3, y_3)$, wherein $x=x_1-x_3$ and $y=y_1-y_2$. Hence, the carriage 306 directly moves to the second starting line 329 corresponding to mark 328 being chosen as the reference point. The carriage 306 then moves y units downward to the scanning starting fine 330 to arrive at the position $(x_1, y_1)$ to commence scanning.

Conventionally, the carriage moves from O (0, 0) to $(x_1, y_1)$ and the number of step counted in the Y direction is $y_1-0=y_1$. According to the method of the invention, the carriage only has to move from $(x_3, y_3)$ to $(x_1, y_1)$ where the number of steps counted in the Y direction is $y_1-y_3$. Hence, the carriage 306 directly moves to the second starting line 329 corresponding to the reference point of the mark $(x_3, y_3)$ and then starts to count the number of the steps from $(x_3, y_3)$ to $(x_1, y_1)$. This decreases the time for counting the number of steps and achieves speedy scanning.

The present invention can also attain a scanning image with high precision as illustrated in the following example. The moving error rate of the carriage is a constant equal to 0.001 units whenever the carriage moves a unit. Let the coordinates $(x_3, y_3)$ of the mark 328 be (580, 720) and the coordinates $(x_1, y_1)$ of the image starting point 324 be (500, 800). Conventionally, the carriage moves 800−0=800 (units) from the origin O (0, 0) to the image starting line 330 with y=800. This results in a moving error of 800*0.001=0.8 (unit). According to the method of the invention, the carriage 306 only has to move 800−720=80 (units) from the second starting line 329 to image starting line 330. The moving error of 80*0.001=0.08 (unit) is far less than the former moving error 0.8 (unit) with the origin O (0, 0) as reference point. The moving error might result from the unsteady transmittal speed of the carriage, external interference, mechanical errors among transmission components, or the transmittal errors of the carriage.

This invention is suitable for the image scanning with high precision due to the high positioning precision of the image starting point, especially for the reduplicate scanning. The reduplicate scanning is performed in the following conditions:

(1) When the scanning comes to a standstill due to insufficient memory, a second scanning is required.

(2) When using a scanner provided with a high image scanning quality, merging two images is a way to promote image quality. After scanning the first chosen image of the document to be scanned once, the carriage moves half a pixel in the Y direction by mechanical adjustment to scan a second time. The two scanned images are then merged and a doubling of the scanning resolution is achieved. Take the scanner with a resolution of 600 dpi (dot per inch) for instance. A first image with a resolution of 600 dpi is obtained in the first scanning and a second image with a resolution of 600 dpi is then obtained in the second scanning after the carriage moves half a pixel. The second image has a displacement of half a pixel in respect to the first image. Hence, even a little moving error may greatly affect the scanning result. Furthermore, a moving error of up to 2 mm happens quite often resulting in double after superimposing the two scanned images. As such, only a tiny error is allowable for utilizing the merging of two images to enhance scanning resolution. The image scanning apparatus with a high precision according to this invention satisfies the requirement of reduplicate scanning. Besides, merging N (N is a positive integer) images deviated with a displacement of 1/N pixel can enhance the image scanning resolution.

There are several ways to set up marks on the image scanning apparatus. An example is stated as follows but not for limiting the invention. The marking group area 318 is a group of marks made of material, for example, plastic which is not easily deformed. The marking group area 318 is placed and plastered on the casing 308 near the platen 302. Generally speaking, the platen 302 is made of glass and disposed on the casing 308. The marking group area 318 can be placed between the glass and casing 308 for protection. While manufacturing, the coordinates of each mark relative to the origin has to be regulated and plastered on its exact position. Another way is to design a groove inside the casing 308 for placing the marking group area 318. The groove having the same size with the marking group area 318 ensures the marking group area 318 is disposed on the exact position steadily.

Figure 5A:
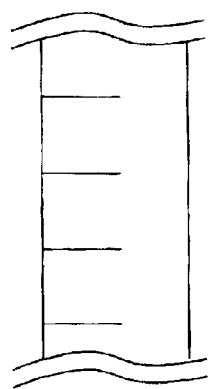
FIGS. 5A to 5E shows schematic diagrams of different marks for the marking group block of FIG. 3.

Referring to FIGS. 5A to 5E, schematic diagrams of different marks for the marking group block of FIG. 3 are shown. As shown in FIG. 5A, the marks are lines perpendicular to the Y direction. The line color can be black while the bottom color is white, for example. One end of the line can be chosen as the reference point. After moving to the reference point directly, the carriage moves to the starting point and then proceeds to scan.

Figure 5B:
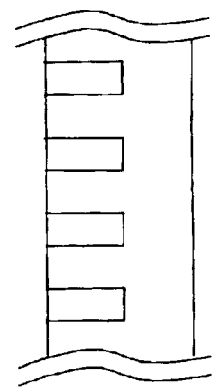

As shown in FIG. 5B, the marks are rectangles, and one corner of one rectangle is chosen as the reference point. After moving to the reference point directly, the carriage moves to the starting point and then proceeds to scan.

Figure 5C:
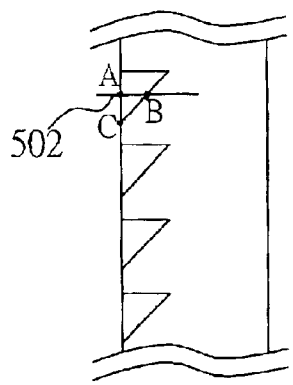

As shown in FIG. 5C, the marks are isosceles right triangles. One of two equal sides of the isosceles right triangle is parallel to X-axis while the other is parallel to Y-axis. One corner with the bigger Y coordinate value of one isosceles right triangle is chosen as the reference point. As long as the carriage moves to the isosceles right triangle, it is easy to obtain the distance between the carriage and the reference point so that the carriage can move to the starting point readily. As shown in FIG. 5C, point C is the reference point. When the carriage moves to the scanning line 502, the positions of point A and point B can be detected and the line segment AB is determined. Since the length of the line segment AB is equal to the length of the line segment AC, the position of the reference point C is thus obtained. Hence, the carriage can quickly move to the starting point and proceed to scan.

Figure 5D:
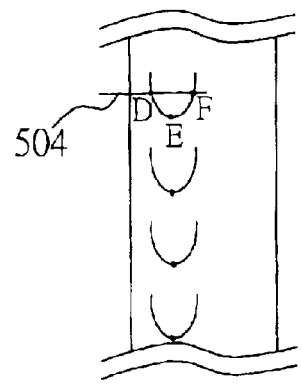

As shown in FIG. 5D, the mark can be a specific function graph, a parabola for example. When the carriage moves to the scanning line 504, the positions of the point D and point F can be detected and the position of the reference point E is obtained from the function of the parabola. Hence, the carriage can quickly move to the starting point and proceed to scan.

Figure 5E:
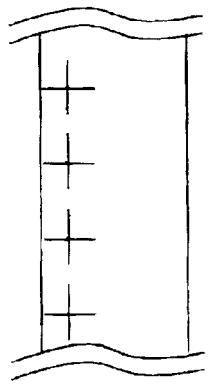

As shown in FIG. 5E, the mark can be a cross. The intersection of one cross is the reference point. After moving to the reference point directly, the carriage moves to the starting point and then proceeds to scan.

The image scanning apparatus according to the preferred embodiment provides precise scanning by positioning a scanning starting point of an image scanning apparatus with a simple marking design. The method for positioning a scanning starting point of an image scanning apparatus can be utilized in various applications, such as decreasing the error of obtaining the scanning starting point and increasing the resolution as well as the speed of image scanning.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for positioning a scanning starting point of an image scanning apparatus, wherein the image scanning apparatus comprises a platen having an orthogonal X-Y coordinate system and for a document to be scanned being placed thereon, and a carriage disposed in the image scanning apparatus and moving along a Y direction for capturing an image of the document to be scanned, the orthogonal X-Y coordinate system having an X-axis being defined by a wide margin of the platen and a Y-axis being defined by a first long margin of the platen, the method comprising the following steps:

(a) choosing one of a plurality of marks inside the image scanning apparatus as a reference point, wherein the chosen mark is located nearest to the image of the document to be scanned;

(b) obtaining a vector from an image starting point of the document to be scanned to the reference point;

(c) moving the carriage to the reference point; and (d) moving the carriage from the reference point to the image starting point according to the vector, and proceeding to scan.

2. The method according to claim 1, wherein the magnitude of the vector is the difference in magnitude between the image starting point and the reference point.

3. The method according to claim 2, wherein the coordinates of the vector are (x, y) in the step (b), the coordinates of the reference point are $(x_n+x, y_n+y)$ when the coordinates of the image starting point are $(x_n, y_n)$.

4. The method according to claim 3, wherein the carriage in step (d) starts to scan from the position with a Y coordinate value of $y_n$.

5. The method according to claim 1, wherein some of the marks have negative Y coordinate values.

6. The method according to claim 1, wherein the marks are located at a second long margin of the platen.

7. The method according to claim 1, wherein the marks have the same X coordinate value.

8. The method according to claim 1, wherein the intersection the X-axis and Y-axis is an origin and the image starting point is the nearest point to the origin among the points located within the image.

9. The method according to claim 1, wherein the step (a) includes:

pre-scanning the document to be scanned to obtain the image of the document to be scanned.

10. An apparatus for positioning a scanning starting point of an image scanning apparatus, comprising:

a platen for a document to be scanned being placed thereon and having an orthogonal X-Y coordinate system, wherein the X-Y coordinate system comprises an X-axis defined by a wide margin of the platen and a Y-axis defined by a first long margin of the platen;

a carriage disposed in the image scanning apparatus and moving along the Y direction from a starting line for capturing an image of the document to be scanned; and a plurality of marks inside the image scanning apparatus for indicating different Y coordinate values, wherein the mark nearest to the image of the document to be scanned is chosen as a reference point for the carriage.

11. The apparatus according to claim 10, wherein the marks located at a second long margin of the platen.

12. The apparatus according to claim 10, wherein the marks are lines perpendicular to the Y direction.

13. The apparatus according to claim 10, wherein the marks are rectangles, and one corner of one rectangle is chosen as the reference point.

14. The apparatus according to claim 10, wherein the marks are isosceles right-angled triangles, one of two equal sides of the isosceles right-angled triangle is parallel to X-axis while the other is parallel to Y-axis, and one corner with the bigger Y coordinate value of one isosceles right-angled triangle is chosen as the reference point.

15. The apparatus according to claim 10, wherein the marks are crosses, and the intersection of one cross is chosen as the reference point.

16. The apparatus according to claim 10, wherein the platen is made of glass.

17. The apparatus according to claim 10, wherein the marks are located in a marking group area.

18. The apparatus according to claim 10 further comprising a casing for protecting the apparatus.

19. The apparatus according to claim 18 further comprising a groove inside the casing for placing and steadying the marking group area.

* * * * *